United States Patent Office 3,184,443
Patented May 18, 1965

3,184,443
METAL-TITANIUM HALIDE CATALYSTS FOR OLEFIN POLYMERIZATION
Harry W. Coover, Jr., and Frederick B. Joyner, Kingsport, Tenn., assignors to Eastman Kodak Company, Rochester, N.Y., a corporation of New Jersey
No Drawing. Filed Apr. 13, 1961, Ser. No. 102,660
The portion of the term of the patent subsequent to Nov. 29, 1977, has been disclaimed and dedicated to the Public
20 Claims. (Cl. 260—93.7)

This application is a continuation-in-part of our copending application, Serial No. 724,900, filed March 31, 1958, and now abandoned.

This invention relates to a new and improved polymerization process and is particularly concerned with the use of a novel catalyst combination for preparing high molecular weight, solid polyolefins, such as polypropylene, of high density and crystallinity. In a particular aspect the invention is concerned with the preparation of polypropylene and higher polyolefins having a high crystallinity and a high density using a particular catalyst combination which has unexpectedly improved catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 100–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain metals have been used in conjunction with inorganic halides to produce high molecular weight polyethylene. Thus, such metals when used in conjunction with titanium tetrachloride permit a low temperature, low pressure polymerization of ethylene to highly crystalline product. When these catalysts are employed to polymerize propylene and higher α-monoolefins, the resulting polymeric product contains large amounts of oils and greases instead of the desired high molecular weight, crystalline product. Obviously, such results are unsatisfactory when a crystalline polymer is the desired product, and it is one of the purposes of this invention to overcome the undesirable results obtained when prior art catalysts are used.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpectedly improved catalytic activity for the polymerization of propylene and higher α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a metal selected from the group consisting of sodium, lithium, potassium, magnesium and zinc, a halide of a metal selected from the group consisting of titanium, vanadium, zirconium, molybdenum and chromium, the halogen atoms being selected from the group consisting of chlorine, bromine and iodine, and a third component selected from the organophosphorus compounds having the formulas $P(O)Y_3$ and $PY_3$ wherein each Y is an alkylamino ($-NR_2$) or alkoxy ($-OR'$), said R and R' being alkyl radicals containing 1 to 8, preferably 1 to 4, carbon atoms. Thus, the organophosphorus compounds can have the following structural formulas: $P(O)(NR_2)_3$, $P(O)(NR_2)_2(OR')_1$, $P(O)(NR_2)(OR')_2$, $P(O)(OR')_3$, $P(NR_2)_3$, $P(NR_2)_2(OR')$, $P(NR_2)(OR')_2$ and $P(OR_2)_3$ wherein R and R' are alkyl radicals as defined above.

Among the organophosphorus compounds that can be employed in our catalyst systems are diethyl N-dimethylamidophosphate, ethyl N,N-tetraethyldiamidophosphate, diethyl N-dimethylamidophosphite, ethyl N,N-tetraethyl diamidophosphite, N,N,N-hexaethyl triamidophosphite, dibutyl N-dipropylamidophosphate, n-pentyl N,N-tetrabutylamidophosphate, dipropyl N-dioctylamidophosphite, n-hexyl N,N-tetrabutyl diamidophosphite, N,N,N-hexa (n-hexyl)triamidophosphite, triethyl phosphite, triethyl phosphate, tributyl phosphite, trioctyl phosphite, N,N,N-hexamethylphosphoramide, N,N,N - hexabutylphosphoramide, N,N,N-hexaoctylphosphoramide, and the like.

Catalyst mixtures that can be employed in practicing our invention are:

(1) Sodium, titanium trichloride and diethyl N-dimethylamidophosphate;
(2) Lithium, titanium tetrachloride and ethyl N,N-tetraethyldiamidophosphate;
(3) Potassium, vanadium trichloride and diethyl N-dimethylamidophosphite;
(4) Magnesium, vanadium tetrachloride and ethyl N,N-tetraethyl diamidophosphite;
(5) Zinc, titanium tetrabromide and N,N,N-hexaethyl triamidophosphite;
(6) Sodium, zirconium tetrabromide and dibutyl N-dipropylamidophosphate;
(7) Zinc, molybdenum pentabromide and n-pentyl N,N-tetrabutyldiamidophosphate;
(8) Potassium, chromium trichloride and dipropyl N-dioctylamidophosphite;
(9) Lithium, titanium tetraiodide and n-hexyl N,N-tetrabutyl diamidophosphite;
(10) Magnesium, titanium tetraiodide and N,N,N-hexa (n-hexyl)triamidoposphite;
(11) Zinc, vanadium tetraiodide and triethyl phosphite;
(12) Sodium, vanadium tetraiodide and triethyl phosphate;
(13) Lithium, titanium tetrachloride and tributyl phosphite;
(14) Potassium, titanium tetrachloride and trioctyl phosphite;
(15) Magnesium, titanium trichloride and N,N,N-hexamethyl phosphoramide;
(16) Zinc, titanium trichloride and N,N,N-hexabutyl phosphoramide; and
(17) Lithium, titanium trichloride and N,N,N-hexaoctyl phosphoramide.

The improved catalytic activity of this mixture was wholly unexpected, particularly since mixtures containing only the metals and the metal halides described above produce large amounts of comparatively low molecular weight products in the polymerization of propylene and higher olefins. The inventive process can be carried out in liquid phase in an inert organic liquid and preferably an inert liquid hydrocarbon vehicle, but excellent results can be obtained without using a solvent. The process proceeds with excellent results over a temperature range of from 0° C. to 250° C., although it is preferred to operate at a temperature of at least 50° C. Likewise, the reaction pressures may be varied widely from about atmospheric pressure to very high pressure of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but they are soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are particularly useful for polymerizing propylene to form a crystalline, high-density polymer. The polypropylene produced has a softening point above 155° C. and a density of 0.91 and higher. Usually, the density of the polypropylene is of the order of 0.91 to 0.92.

The polypropylene, polybutenes and polystyrene prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process. Other poly-α-olefins as well as copolymers of ethylene and propylene can also be prepared and have similarly improved properties.

As has been indicated above the improved results obtained in accordance with this invention depend upon the particular catalyst combination. Thus, one of the components of the catalyst is a metal selected from the group consisting of sodium, lithium, potassium, magnesium and zinc. Another component of the catalyst composition is a halide of a transition metal selected from the group consisting of titanium, vanadium, zirconium, molybdenum and chromium, the halogen atoms being selected from the group consisting of chlorine, bromine and iodine. The third component of the catalyst composition is an organophosphorus compound as previously defined.

The limiting factor in the temperature of the process appears to be the decomposition temperature of the catalyst. Ordinarily, temperatures from 50° C. to 150° C. are employed, although temperatures as low as 0° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The preferred molar ratio of metal to transition metal halide can be varied within the range of 1:0.5 to 1:2, and the molar ratio of transition metal halide to the third component of the catalytic mixture can be varied within the range of 1:1 to 1:0.1, but it will be understood that higher and lower molar ratios are within the scope of this invention. A particularly effective catalyst contains one mole of transition metal tetrahalide and 0.25 mole of the third component per mole of metal. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene and other α-monoolefins in accordance with this invention is a mixture of sodium, titanium tetrachloride and hexamethyl phosphoric triamide. The importance of the various components of this reaction mixture is evident from the fact that in polymerizing proplyene a mixture of sodium and titanium tetrachloride is ineffective for polymerizing propylene to form solid, crystalline polymer. However, when the above triamide or other third component within the scope of this invention is added to the mixture the resulting catalyst composition is highly effective for polymerizing propylene to form a highly crystalline high density polymer. Similarly, when propylene is polymerized in the presence of a mixture of lithium and titanium tetrachloride, the catalyst is effective for producing crystalline polymer only at comparatively high temperatures. The catalysts of this invention are effective for producing excellent yields of crystalline polymer at considerably lower temperatures.

The invention is illustrated by the following examples of certain preferred embodiments thereof:

Example 1

In a nitrogen-filled dry box a dry 280 ml. stainless steel autoclave was loaded with 50 ml. of dry heptane, a 1.5 gram charge of catalyst having a 1:1:0.25 molar ratio of sodium, titanium tetrachloride and hexamethyl phosphoric triamide. The autoclave was capped, removed from the dry box, and placed in a rocker. 100 ml. (51 grams) of propylene was added. The mixture was rocked, heated to 200° C. and maintained there for four hours. The solid polypropylene which formed was washed with dry methanol and then with hot water to remove catalyst residues. The yield of highly crystalline polypropylene was 38.7 grams of 0.919 density and 1.78 inherent viscosity.

When the hexamethyl phosphoric triamide was omitted from the above run, no solid polypropylene was formed.

In the above run three-component catalysts containing either magnesium or zinc in place of sodium produce good yields of highly crystalline polypropylene.

Example 2

The process of Example 1 was followed replacing the heptane from the reaction and using a 1.5 gram catalyst charge containing a 1:1:0.1 molar ratio of lithium, titanium tetrachloride and each of the following third components:

Triethyl phosphate
Tributyl phosphate

At a polymerization temperature of 180° C. good yields of highly crystalline polypropylene were obtained in four hours.

Example 3

The process of Example 1 was followed replacing the sodium with potassium and the titanium tetrachloride with either titanium tetrabromide or titanium tetraiodide. Good yields of highly crystalline polymer were obtained.

Example 4

Using the process of Example 1, good yields of highly crystalline solid polyolefins are obtained using the following olefins: 1-butene, 1-pentene, 4-methyl-1-pentene, styrene, fluorostyrene and vinylcyclohexane.

Example 5

Inside a nitrogen-filled dry box the following materials were placed into a dry, 500-ml. pressure bottle: 100 ml. of dry heptane and 3 g. of a catalyst mixture which comprised a 1:1:0.25 molar ratio of sodium (dispersion), titanium tetrachloride, and triethyl phosphate. The pressure bottle was removed from the dry box, attached to a Parr hydrogenation apparatus in which propylene was being used in place of hydrogen, and shaking was initiated. The bottle and its contents were heated to 75° C. under 30 p.s.i. propylene pressure and maintained under these conditions for a total of 6 hours. The reaction vessel was detached then from the shaking apparatus, dry isobutyl alcohol was added to deactivate the catalyst, and then the polymer was washed with hot, dry isobutanol to remove the catalyst residues. A total of 8.2 g. of highly crystalline polypropylene was obtained having an inherent viscosity in tetralin at 145° C. of 2.10 and a density of 0.910.

When a control experiment was run using only the sodium and titanium tetrachloride, omitting the triethyl phosphate, no solid polypropylene was formed under the above conditions.

Example 6

Inside a nitrogen-filled dry box the following materials were placed into a 285-ml. stainless steel autoclave: 100 ml. of dry mineral spirits (B.P. 197° C.), a total of 2 g. of a 1:1:0.25 molar ratio of potassium metal, titanium tetraiodide and triethyl phosphite. The autoclave was then placed in a rocker attached to a source of liquid propylene and 100 ml. of anhydrous liquid propylene monomer was added. Rocking was initiated and the mixture was heated to 85° C. and maintained at this temperature during a polymerization period of 6 hours. The polymer was worked up as described in Example 5 to give a yield of 6.8 g. of highly crystalline polypropylene having an inherent viscosity of 2.50 in tetralin at 145° C. When hydrogen was admitted to the polymerization vessel and was maintained there at 50 p.s.i. partial pressure, the inherent viscosity of the product was 1.75. An increase in the hydrogen pressure to 500 p.s.i. in a similar experiment produced a very low molecular weight crystalline polypropylene of inherent viscosity 0.35.

Example 7

The procedure of Example 6 was used to polymerize propylene with no solvent present. One hundred grams of propylene monomer was used and within the 6-hour polymerization period at 85° C., a 14.0-g. yield of highly crystalline polypropylene of inherent viscosity 2.95 obtained.

Example 8

The procedure of Example 6 was employed to polymerize a 50-g. charge of 3-methyl-1-butene using 3 g. of catalyst made up of lithium metal, vanadium tetrachloride and diethyl N-dimethylamidophosphate in a molar ratio of 1:1:0.1. The yield was 20 g. of highly crystalline poly(3-methyl-1-butene) having an inherent viscosity of 1.70 and a crystalline melting point (powder) of 304 to 308° C.

Example 9

The procedure of Example 6 was used to polymerize a 50-g. charge of styrene using 1 g. of catalyst comprised of magnesium metal, vanadium tetrachloride and ethyl N-dimethylamidophosphate in a 1:2:2 molar ratio. A 20-g. yield of crystalline polystyrene was obtained. This polymer had an inherent viscosity of 2.60 and a crystalline melting point of 230 to 235° C.

Example 10

The procedure of Example 6 was employed to polymerize allylbenzene using 2 g. of a catalyst comprised of zinc metal, zirconium tetrachloride and diethyl N-dimethylamidophosphite in a 1:2:1 molar ratio. The yield of crystalline poly(allylbenzene) was 20%.

Example 11

The procedure of Example 6 was employed to polymerize vinylcyclohexane using 2 g. of catalyst composed of a 2:2:1 molar ratio of potassium metal, molybdenum pentachloride and ethyl N,N-tetraethyldiamidophosphite. A 15% yield of highly crystalline poly(vinylcyclohexane) having an inherent vicosity of 1.57 was obtained.

Example 12

The procedure of Example 6 was employed to polymerize butadiene using a 1:2:0.5 molar ratio of sodium metal, chromium tribromide and N,N,N-hexaethyltriamidophosphate. From 50 g. of butadiene monomer, a 27-g. yield of polybutadiene of inherent viscosity 1.60 was obtained.

Example 13

In a nitrogen-filled dry box, a 7-oz. tapered pressure bottle was charged in order with 40 ml. of dry benzene, 20 g. of 4-methyl-1-pentene and 1 g. of a catalyst consisting of magnesium metal, titanium tetrachloride and tributyl phosphite in a molar ratio of 1:1:2. The bottle was capped, placed on a rotating wheel in a constant-temperature water bath maintained at 70° C. and was allowed to remain under these conditions for 24 hours. At the end of this period, the bottle was removed, allowed to cool and opened. The polymer was dissolved in hot xylene and reprecipitated by the addition of dry isobutanol to the xylene solution in a Waring Blendor. The polymer was washed several times with hot isobutanol and was dried. The crystalline poly(4-methyl-1-pentene) weighed 5.0 g. and melted at 235 to 240° C.

Example 14

The procedure of Example 6 was followed except that the catalyst charge was 1 g. of a mixture of lithium (dispersion), titanium tetrachloride and dibutyl N-dipropylamidophosphate in a molar ratio of 1:1:0.5. The polymerization temperature was 85° C. The crystalline polypropylene obtained had a density of 0.914 and an inherent viscosity of 2.35.

Other organophosphorus compounds which may be used in place of dibutyl N-dipropylamidophosphate to give similar results include n-pentyl N,N-tetrabutyldiamidophosphate, dipropyl N-dioctylamidophosphite, n-hexyl N,N-tetrabutyldiamidophosphite, N,N,N-hexa (n-hexyl)triamidophosphite, trioctyl phosphite, N,N,N-hexabutylphosphoramide and N,N,N-hexaoctyl phosphoramide.

Thus, by means of this invention polyolefins such as polypropylene are readily produced using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments and the like, or mixed with other polymeric materials, waxes and the like. In general, the polymers embodying this invention can be treated in similar manner to those obtained by other processes.

From the detailed disclosure of this invention, it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-olefinic hydrocarbons containing 3 to 10 carbon atoms to form solid crystalline polymer, the improvement which comprises catalyzing the polymerization with a catalytic mixture containing a metal selected from the group consisting of sodium, lithium, potassium, magnesium and zinc, a halide of a transition metal selected from the group consisting of titanium, vanadium, zirconium, molybdenum and chromium, and an organophosphorus compound having the formulas $P(O)Y_3$ and $PY_3$ wherein each Y is selected from the group consisting of alkylamino and alkoxy radicals, the alkyl and alkoxy radicals containing 1 to 8 carbon atoms.

2. In the polymerization of propylene to form solid, crystalline polymer, the improvement which comprises effecting the polymerization in the presence of a catalytic mixture of lithium, a titanium halide and a trialkyl phosphite wherein the alkyl radicals contain 1 to 8 carbon atoms.

3. In the polymerization of propylene to form solid, crystalline polymer, the improvement which comprises effecting the polymerization in the presence of a catalytic mixture of potassium, a titanium halide and a trialkyl phosphate wherein the alkyl radicals contain 1 to 8 carbon atoms.

4. In the polymerization of propylene to form solid, crystalline polymer, the improvement which comprises effecting the polymerization in the presence of a catalytic mixture of sodium, a titanium halide and a hexaalkyl phosphoramide wherein the alkyl radicals contain 1 to 8 carbon atoms.

5. In the polymerization of propylene to form solid, crystalline polymer, the improvement which comprises effecting the polymerization in the presence of a catalytic mixture consisting essentially of sodium, titanium trichloride and tris-N,N-dimethylphosphoramide, the molar ratio of titanium trichloride to tris-N,N-dimethylphosphoramide being within the range of 1:1 to 1:0.1.

6. In the polymerization of propylene to form solid, crystalline polymer, the improvement which comprises effecting the polymerization in the presence of a catalytic mixture consisting essentially of sodium, vanadium trichloride and tris-N,N-dimethylphosphoramide, the molar ratio of vanadium trichloride to tris-N,N-dimethylphosphoramide being within the range of 1:1 to 1:0.1.

7. In the polymerization of propylene to form solid, crystalline polymer, the improvement which comprises effecting the polymerization in the presence of a catalytic mixture consisting essentially of magnesium, titanium trichloride and triethyl phosphate, the molar ratio of titanium trichloride to triethyl phosphate being within the range of 1:1 to 1:0.1.

8. In the polymerization of propylene to form solid, crystalline polymer, the improvement which comprises effecting the polymerization in the presence of a catalytic mixture consisting essentially of zinc, titanium trichloride and triethyl phosphite, the molar ratio of titanium trichloride to triethyl phosphite being within the range of 1:1 to 1:0.1.

9. In the polymerization of propylene to form solid, crystalline polymer, the improvement which comprises effecting the polymerization in liquid dispersion in an inert hydrocarbon liquid and in the presence of a catalytic mixture consisting essentially of sodium, titanium tetrachloride and hexamethyl phosphoric triamide, the molar ratio of titanium tetrachloride to hexamethyl phosphoric triamide being within the range of 1:1 to 1:0.1.

10. In the polymerization of propylene to form solid, crystalline polymer, the improvement which comprises effecting the polymerization in liquid dispersion in an inert liquid hydrocarbon vehicle and in the presence of a catalytic mixture consisting essentially of a molar ratio of sodium and titanium tetrachloride of 1:0.5 to 1:2 and a molar ratio of titanium tetrachloride and hexamethyl phosphoric triamide within the range of 1:1 to 1:0.1 at a temperature of 55 to 250° C. and a pressure within the range of atmospheric to 20,000 p.s.i.

11. As a composition of matter, a catalytic mixture for the polymerization of α-olefinic hydrocarbons containing 3 to 10 carbon atoms containing a metal selected from the group consisting of sodium, lithium, potassium, magnesium and zinc, a halide of a transition metal selected from the group consisting of titanium, vanadium, zirconium, molybdenum and chromium, and an organophosphorus compound having the formulas $P(O)Y_3$ and $PY_3$ wherein each Y is selected from the group consisting of alkylamino and alkoxy radicals, the alkyl and alkoxy radicals containing 1 to 8 carbon atoms.

12. As a composition of matter, a catalytic mixture of lithium, a titanium halide and a trialkyl phosphite wherein the alkyl radicals contains 1 to 8 carbon atoms.

13. As a composition of matter, a catalytic mixture of potassium, a titanium halide and a trialkyl phosphate wherein the alkyl radicals contain 1 to 8 carbon atoms.

14. As a composition of matter, a catalytic mixture of sodium, a titanium halide and a hexaalkyl phosphoramide wherein the alkyl radicals contain 1 to 8 carbon atoms.

15. As a composition of matter, a catalytic mixture consisting essentially of sodium, titanium trichloride and tris-N,N-dimethylphosphoramide, the molar ratio of titanium trichloride to tris-N,N-dimethylphosphoramide being within the range of 1:1 to 1:0.1.

16. As a composition of matter, a catalytic mixture consisting essentially of sodium, vanadium trichloride and tris-N,N-dimethylphosphoramide, the molar ratio of vanadium trichloride to tris-N,N-dimethylphosphoramide being the range of 1:1 to 1:0.1.

17. As a composition of matter, a catalytic mixture consisting essentially of magnesium, titanium trichloride and triethyl phosphate, the molar ratio of titanium trichloride to triethyl phosphate being within the range of 1:1 to 1:0.1.

18. As a composition of matter, a catalytic mixture consisting essentially of zinc, titanium trichloride and triethyl phosphite, the molar ratio of titanium trichloride to triethyl phosphite being within the range of 1:1 to 1:0.1.

19. As a composition of matter, a catalytic mixture consisting essentially of sodium, titanium tetrachloride and hexamethyl phosphoric triamide, the molar ratio of titanium tetrachloride to hexamethyl phosphoric triamide being within the range of 1:1 to 1:0.1.

20. As a composition of matter, a catalytic mixture consisting essentially of a molar ratio of sodium and titanium tetrachloride of 1:0.5 to 1:2 and a molar ratio of titanium tetrachloride and hexamethyl phosphoric triamide within the range of 1:1 to 1:0.1.

References Cited by the Examiner
UNITED STATES PATENTS

| | | | |
|---|---|---|---|
| 2,996,459 | 8/61 | Andersen et al. | 252—429 |
| 2,962,487 | 11/60 | Coover | 260—93.7 |
| 2,967,856 | 1/61 | Coover et al. | 260—93.7 |
| 2,996,459 | 8/61 | Andersen et al. | 252—429 |

JOSEPH L. SCHOFER, *Primary Examiner.*

M. LIEBMAN, WILLIAM H. SHORT, *Examiner.*